United States Patent
DeLucca et al.

(10) Patent No.: US 9,058,339 B2
(45) Date of Patent: Jun. 16, 2015

(54) SOURCE CONTROL INHERITANCE LOCKING

(75) Inventors: Albert A. DeLucca, Wantagh, NY (US);
Lisa Seacat DeLuca, San Francisco, CA (US); Soobaek Jang, Hamden, CT (US); Troy Michael Volin, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 13/604,928

(22) Filed: Sep. 6, 2012

(65) Prior Publication Data

US 2014/0025653 A1    Jan. 23, 2014

Related U.S. Application Data

(63) Continuation of application No. 13/552,323, filed on Jul. 18, 2012, now Pat. No. 8,612,407.

(51) Int. Cl.
*G06F 17/30*    (2006.01)
*G06F 7/00*    (2006.01)

(52) U.S. Cl.
CPC .... *G06F 17/30171* (2013.01); *G06F 17/30607* (2013.01)

(58) Field of Classification Search
USPC .................................................. 707/704, 802
See application file for complete search history.

(56) References Cited

U.S. PATENT DOCUMENTS

| | | |
|---|---|---|
| 5,161,227 A | 11/1992 | Dias et al. |
| 5,867,708 A | 2/1999 | Copeland et al. |
| 6,529,905 B1 | 3/2003 | Bray et al. |
| 7,454,408 B2 * | 11/2008 | Koffron ................................. 1/1 |
| 8,612,407 B1 | 12/2013 | DeLucca et al. |
| 2004/0210604 A1 * | 10/2004 | Li et al. ....................... 707/104.1 |
| 2005/0021487 A1 * | 1/2005 | Verma et al. ....................... 707/1 |
| 2005/0149945 A1 | 7/2005 | Stichnoth |
| 2006/0025700 A1 | 2/2006 | Fallik |
| 2007/0083484 A1 * | 4/2007 | McVeigh et al. .................. 707/1 |

(Continued)

FOREIGN PATENT DOCUMENTS

| | | |
|---|---|---|
| CA | 2430383 A1 | 11/2004 |
| JP | 2008117340 A | 5/2008 |

OTHER PUBLICATIONS

Perks, m.-et al.; "Method Allowing a SOM Class to Inherit from A C++ Class"; http://www.ip.com/pubview/IPCOM000115371D; Apr. 1, 1995.

(Continued)

*Primary Examiner* — Kuen Lu
(74) *Attorney, Agent, or Firm* — Cahn & Samuels, LLP

(57) ABSTRACT

An embodiment of the invention provides a method for source control in a program, wherein the program includes hierarchical files for execution of processes, wherein the hierarchical files include parent files and child files. A revised process selected by a user on a graphical user interface is identified; and, files in the revised process are identified. The files in the revised process are locked with a source control processor. This includes disallowing revisions to the files in the revised process. One or more files that are descendents of a file in the revised process are identified. The one or more files that are descendents of a file in the revised process are locked with the source control processor. This includes disallowing revisions to the one or more files that are descendents of a file in the revised process.

20 Claims, 3 Drawing Sheets

(56) References Cited

U.S. PATENT DOCUMENTS

| | | |
|---|---|---|
| 2008/0021916 A1* | 1/2008 | Schnelle et al. ............ 707/101 |
| 2009/0055799 A1 | 2/2009 | Cao et al. |
| 2009/0235034 A1 | 9/2009 | Holt |
| 2010/0275190 A1 | 10/2010 | Ishizaki |
| 2011/0071993 A1* | 3/2011 | Vasudevan et al. .......... 707/704 |
| 2011/0078246 A1 | 3/2011 | Dittmer-Roche |
| 2014/0026116 A1 | 1/2014 | DeLucca et al. |
| 2014/0026117 A1 | 1/2014 | DeLucca et al. |

OTHER PUBLICATIONS

Sha, L.-et al.; "Priority Inheritance Protocols—An Approach to Real-Time Synchronization"; http://www.ip.com/pubview/IPCOM000148166D; Dec. 10, 1987.

Preston, Jon A., et al., "An Efficient Synchronous Collaborative Editing System Employing Dynamic Locking of Varying Granularity in Generalized Document Trees", 2006.

Ebrahimmalek, Hamed, "Strategized Locking Pattern", Feb. 9, 2009.

Magnusson, Boris, et al., "Fine grained version control of configurations in COOP/Orm", 1996.

Preston, J. A. et al. "A Deadlock-Free Multi-Granular, Hierarchical Locking Scheme for Real-time Collaborative Editing". Proceedings of the 7th International Workshop on Collaborative Editing Systems. Sanibel Island, FL, 2005.

Preston, J. A. et al. "An Efficient Synchronous Collaborative Editing System Employing Dynamic Locking of Varying Granularity in Generalized Document Trees". 2006 IEEE.

Notice of Allowance for U.S. Appl. No. 13/552,323. Aug. 12, 2013.

Non-final Office action for U.S. Appl. No. 13/552,323. Apr. 9, 2013.

Non-final Office action for U.S. Appl. No. 13/604,936. May 21, 2014.

* cited by examiner

SOURCE CONTROL INHERITANCE LOCKING

This patent application is a continuation application of U.S. patent application Ser. No. 13/552,323 filed on Jul. 18, 2012, which is hereby incorporated by reference.

BACKGROUND

The present invention is in the field of methods and computer program products for source control inheritance locking Source code, also referred to as source or code, is any sequence of statements and/or declarations written in some human-readable computer programming language. Programming languages are artificial languages that can be used to control the behavior of a machine, particularly a computer. More specifically, a programming language is used to write computer programs, which instruct a computer to perform some kind of computation, and possibly control external devices.

To ensure that a computer program is complete, precise and accurate, software development projects often employ hundreds of software developers to write and edit the program code. In such cases, it is common for multiple software developers to work on a program code at the same time such as, for example, editing different or the same sections of the program code.

SUMMARY OF THE INVENTION

An embodiment of the invention provides a method for source control in a program, wherein the program includes a plurality of hierarchical files for execution of a plurality of processes, wherein the hierarchical files include parent files and child files. A revised process selected by a user on a graphical user interface is identified; and, files in the revised process are identified. The files in the revised process are locked with a source control processor. The locking of the files in the revised process includes disallowing revisions to the files in the revised process. One or more files that are descendents of a file in the revised process are identified. The one or more files that are descendents of a file in the revised process are locked with the source control processor. The locking of the one or more files that are descendents of a file in the revised process includes disallowing revisions to the one or more files that are descendents of a file in the revised process.

Another embodiment of the invention provides a method for source control in a program, wherein the program includes a plurality of hierarchical nodes for execution of a plurality of processes, wherein the hierarchical nodes include parent nodes and child nodes. A revised process selected by a user on a graphical user interface is identified; and, nodes in the revised process are identified. The nodes in the revised process are locked with a source control processor. The locking of the nodes in the revised process includes disallowing revisions to the nodes in the revised process. One or more nodes that share a parent with a node in the revised process are identified. The one or more nodes that share a parent with a node in the revised process are locked with the source control processor. The locking of the one or more nodes that share a parent with a node in the revised process includes disallowing revisions to the one or more nodes that share a parent with a node in the revised process.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Figure 1:
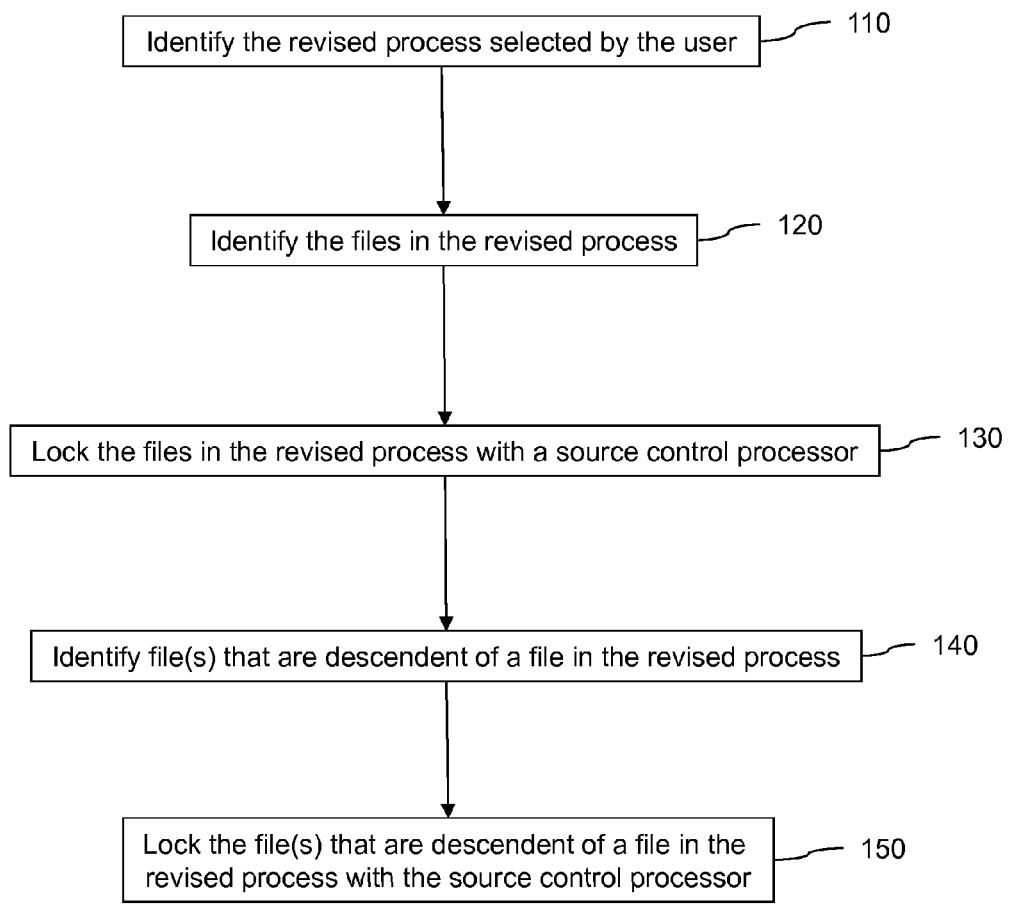
FIG. 1 is a flow diagram illustrating a method for source control in a program according to an embodiment of the invention.

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention includes a method of locking logical sections in a file within a source control system and extending the locks to other related artifacts according to their role in an object-oriented hierarchy. In an object-oriented programming environment, concrete objects are composed not only of the fields and methods (also referred to herein as "processes") explicitly present in their class, but also those fields and methods that the concrete objects inherit. Even when a class overrides an inherited method, the inherited method can invoke the obscured or hidden method using super( )(or a language-equivalent function).

An embodiment of the invention locks the effective content of a concrete class. That is, if the structure of a class is locked, interfaces and classes that are antecedent to this class may not add methods or fields which would be inherited by this class. As used herein, the term "interface" can be used to refer to abstract classes and normal classes which are subclassed and overridden in the same manner as interfaces. If the inherited example (String) method on this class is locked, changes to any of the parent methods in the hierarchy are not allowed.

If a lock is claimed for an entire interface, then structural changes cannot be made to extenders (i.e., other interfaces) or implementors of the methods declared in the locked interface. Therefore, adding or removing calls to super( ) and adding or removing overriding methods are not allowed. Furthermore, addition or removal of classes implementing and/or extending the interface is not allowed. As described below, locking an interface with all its methods prevents any changes to code in overriding and/or implementing methods. Locking does not only apply to operations on a class; rather, locking also applies to items that access a field (piece of data maintained by a class) or a nested class. Furthermore, any descendant that is accessing the nested class defined by the locked class is also subsequently locked.

In at least one embodiment of the invention, a lock on a method of an interface prevents changes to code in implementing and/or overriding methods. Specifically, addition or removal of methods specified by that interface is not allowed. Furthermore, code changes within methods declared by that interface are not allowed. In addition to Java, inheritance locking applies to various programming languages which support inheritance, virtual methods (C++), etc.

An embodiment of the invention defines a public interface which is "pluggably" implemented by various implementation providers. The following is an example in the context of an implementor of this interface, given a Software Development Kit (SDK) (interface). A vendor creates three implementations of the interface; the vendor's free version, standard version, and enterprise version. The free version is distinct from the standard and enterprise versions. The enterprise version extends classes that are implemented in the standard version. A development manager decides to fundamentally change the way that IP addresses are associated with instances. The development manager locks the entire IpAddress interface (in the SDK) and all its methods. The setters and getters on the IP addresses on the instance object, and the service methods that dynamically associate and dissociate IP addresses with instances, are also locked by the development manager. Until it is determined how to proceed on IP addresses, code changes around the IP address assignment cannot be made. In the case of the enterprise version, a subclass of the standard version's IpAddress implementation cannot be created (if one has not already been created). Moreover, the dynamic associate and/or dissociate service methods (which were being inherited from the standard version's service implementation) cannot be overridden.

Figure 2:
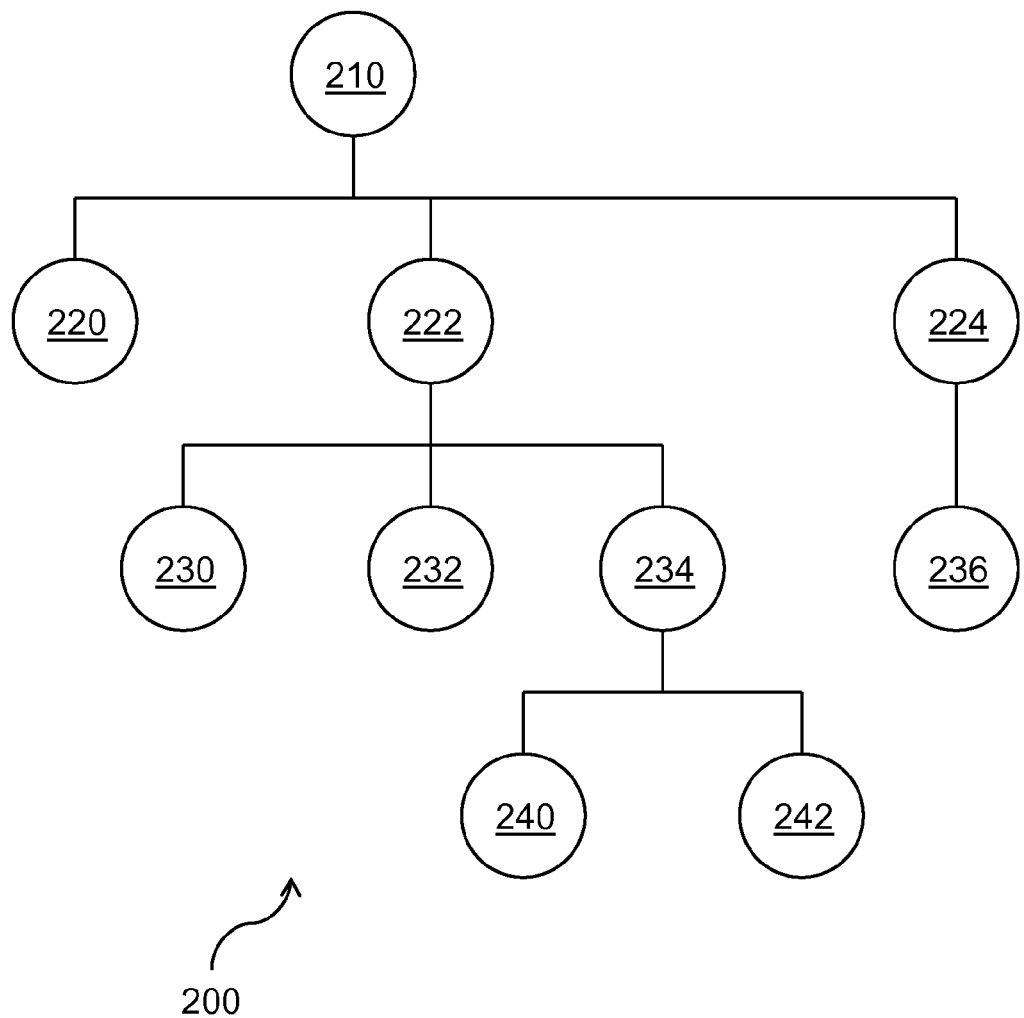
FIG. 2 illustrates a program including hierarchy of files according to an embodiment of the invention.

FIG. 1 is a flow diagram illustrating a method for source control in a program according to an embodiment of the invention. The program includes a plurality of hierarchical files (also referred to herein as "nodes") for execution of a plurality of processes. The hierarchical files include parent files and child files (also referred to herein as "parent nodes" and "child nodes", respectively). FIG. 2 illustrates a program 200 including a hierarchy of files according to an embodiment of the invention. File 210 is a parent of files 220, 222, and 224. File 222 is a parent of files 230, 232, and 234; and, file 224 is a parent of file 236. File 234 is a parent of files 240 and 242. In at least one embodiment, for example, a first process can run on files 222, 232, 234, and 242. In another embodiment, for example, a second process can run on files 222, 230, 234, and 240. In yet another embodiment, for example, a third process can run on files 220, 222, 224, and 236. A process can use an entire file, or just a portion of a file.

A user selects a process in the program to revise, for example, using a graphical user interface. For example, in one embodiment, the user selects a process to revise using an IBM® Rational® Application Developer interface (available from International Business Machines Corporation, Armonk, N.Y., U.S.). The revised process selected by the user is identified 110. For example, in FIG. 2, the user selects the first process to revise. The files in the revised process are identified 120. Thus, in the preceding example, files 222, 232, 234, and 242 are identified. In at least one embodiment of the invention, the revised process and/or the files in the revised process are identified with a computer processor.

The files in the revised process are locked with a source control processor 130. When the files are locked, revisions to the files are not allowed. Thus, for example, write and delete operations are not permitted to files 222, 232, 234, and 242.

File(s) that are a descendent of a file in the revised process are identified 140 (e.g., with the computer processor). In at least one embodiment of the invention, this includes identifying one or more files that share a parent with a file in the revised process. In the example above, files 230, 232, 234, 240, and 242 are identified as being descendent of a file in the revised process.

The file(s) that are a descendent of a file in the revised process are locked with the source control processor 150. This includes disallowing revisions to the file(s) that are a descendent of a file in the revised process. Thus, write and delete operations are not permitted to files 230, 232, 234, 240, and 242. Files 230 and 240 are locked even though they are not in the revised process. Thus, in the example, files 222, 230, 232, 234, 240, and 242 are locked.

In at least one embodiment of the invention, the source control processor prohibits the addition and/or deletion of a child file to each locked file in the program. Therefore, new child files cannot be added under files 222, 230, 232, 234, 240, and 242. Furthermore, because files 230, 232, 234, 240, and 242 are child files of a locked file, they cannot be deleted.

In at least one embodiment of the invention, file(s) that have a locked parent file are identified. For instance, file 230 is identified because it is a child node of file 222, which was locked by the source control processor in item 130. File 240 is also identified because it is a child node of file 234, which was also locked by the source control processor in item 130. The file(s) that have a locked parent file are locked. This includes disallowing revisions to the file(s) that have a locked parent file. In at least one embodiment, if file 230 is locked by another entity before file 222 is locked (e.g., by the source control processor in item 130), then the source control processor will not be able to lock any of the files in the program 200 until file 230 is unlocked by the other entity.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
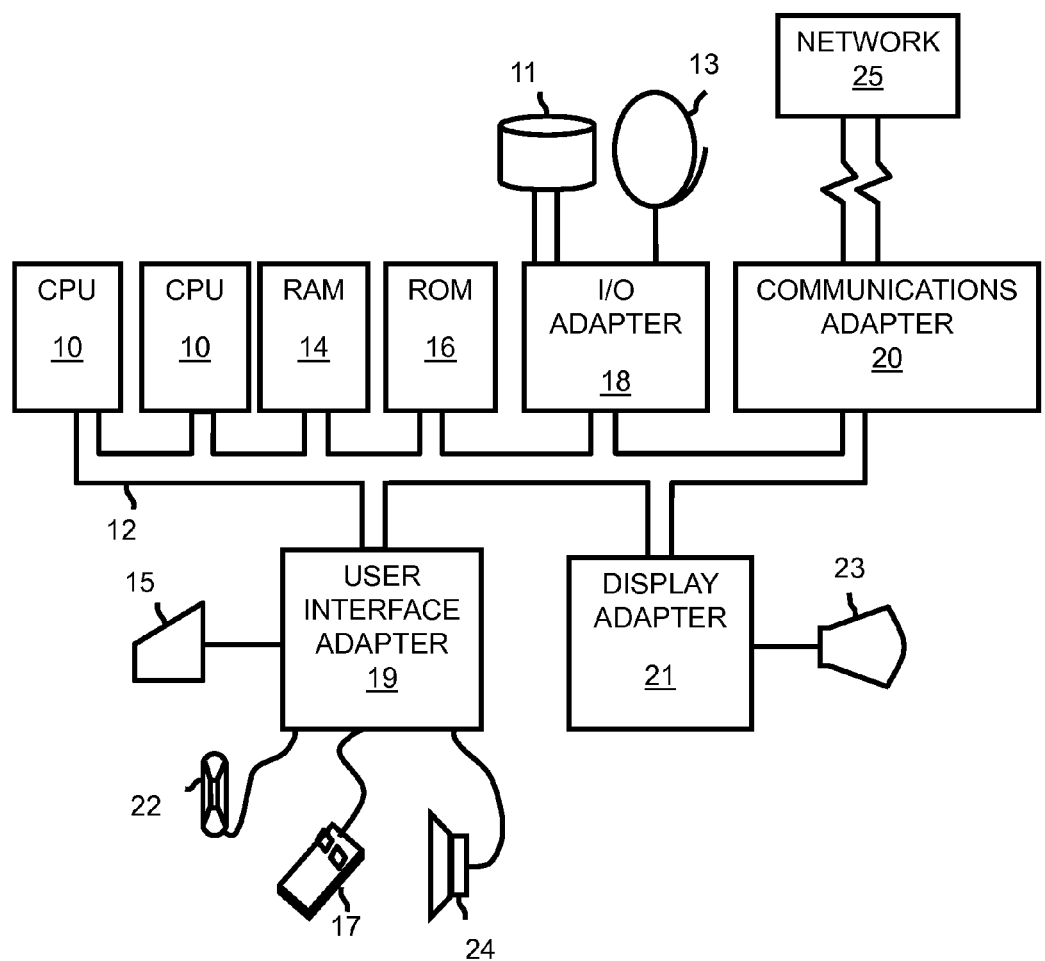
FIG. 3 illustrates a computer program product according to an embodiment of the invention.

Referring now to FIG. 3, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for source control in a program, the program comprising a plurality of hierarchical files for execution of a plurality of processes, the hierarchical files comprising parent files and child files, said system comprising:

a graphical user interface for selection of a process of the plurality of processes by a user, the selected process including less than all of the files in the program;

a computer processor for identifying files in the selected process and identifying at least one file that is a descendent of a file in the selected process; and a source control processor for locking the files in the selected process, the locking of the files in the selected process includes disallowing revisions to the files in the selected process, said source control processor locks the at least one file that is a descendent of a file in the selected process, the locking of the at least one file that is a descendent of a file in the selected process includes disallowing revisions to the at least one file that is a descendent of a file in the selected process, wherein said source control processor only locks the files in the selected process and the at least one file that is a descendent of a file in the selected process such that revisions are allowed to files not in the selected process and files that are not descendent of a file in the selected process.

2. The system according to claim 1, wherein said computer processor identifies at least one file that has a locked parent file, and wherein said source control processor locks the at least one file that has a locked parent file, the locking of the at least one file that has a locked parent file includes disallowing revisions to the at least one file that has a locked parent file.

3. The system according to claim 1, wherein said source control processor prohibits addition of a child file to each locked file in the program.

4. The system according to claim 1, wherein said source control processor prohibits deletion of a child file to each locked file in the program.

5. The system according to claim 1, wherein said computer processor identifies at least one file that shares a parent with a file in the selected process.

6. The system according to claim 5, wherein said source control processor prohibits deletion of a child file to each locked file in the program.

7. The system according to claim 1, wherein the revisions comprise at least one of write operations and delete operations.

8. The system according to claim 5, wherein said source control processor prohibits addition of a child file to each locked file in the program.

9. A system for source control in a program, the program comprising a plurality of hierarchical nodes for execution of a plurality of processes, the hierarchical nodes comprising parent nodes and child nodes, said system comprising:

a graphical user interface for selection of a process of the plurality of processes by a user, the selected process including less than all of the files in the program;

a computer processor for identifying nodes in the selected process and identifying at least one node that shares a parent with a node in the selected process;

a source control processor for locking the nodes in the selected process, the locking of the nodes in the selected process includes disallowing revisions to the nodes in the selected process, said source control processor locks the at least one node that shares a parent with a node in the selected process, the locking of the at least one node that shares a parent with a node in the selected process includes disallowing revisions to the at least one node that shares a parent with a node in the selected process, wherein said source control processor only locks the files in the selected process and the at least one node that shares a parent with a node in the selected process such that revisions are allowed to files not in the selected process and files that do not share a parent with a node in the selected process.

10. The system according to claim 9, wherein said computer processor identifies at least one node that has a locked parent node, and wherein said source control processor locks the at least one node that has a locked parent node, the locking of the at least one node that has a locked parent node includes disallowing revisions to the at least one node that has a locked parent node.

11. The system according to claim 10, wherein said source control processor prohibits addition of a child node to each locked node in the program, and wherein said source control processor prohibits deletion of a child node to each locked node in the program.

12. The system according to claim 9, wherein said source control processor prohibits addition of a child node to each locked node in the program.

13. The system according to claim 9, wherein said source control processor prohibits deletion of a child node to each locked node in the program.

14. The system according to claim 9, wherein the revisions comprise at least one of write operations and delete operations.

15. A system for source control in a program, the program comprising a plurality of hierarchical files for execution of a plurality of processes, the hierarchical files comprising parent files and child files, said system comprising:

a graphical user interface for selection of a process of the plurality of processes by a user, the selected process including less than all of the files in the program;

a computer processor for identifying files in the selected process and identifying at least one file that is a descendent of a file in the selected process; and a source control processor for locking the files in the selected process, the locking of the files in the selected process includes disallowing revisions to the files in the selected process, said source control processor locks the at least one file that is a descendent of a file in the selected process, the locking of the at least one file that is a descendent of a file in the selected process includes disallowing revisions to the at least one file that is a descendent of a file in the selected process, said source control processor prohibits at least one of addition of a child file to each locked file in the program and deletion of a child file to each locked file in the program, wherein said source processor only locks the files in the selected process and the at least one file that is a descendent of a file in the selected process such that revisions are allowed to files not in the selected process and files that are not descendent of a file in the selected process.

16. The system according to claim 15, wherein said computer processor identifies at least one file that has a locked parent file, and wherein said source control processor locks the at least one file that has a locked parent file, the locking of the at least one file that has a locked parent file includes disallowing revisions to the at least one file that has a locked parent file.

17. The system according to claim 15, wherein said computer processor identifies at least one file that shares a parent with a file in the selected process.

18. The system according to claim 17, wherein the revisions comprise at least one of write operations and delete operations.

19. The system according to claim 17, wherein said source control processor prohibits addition of a child file to each locked file in the program.

20. The system according to claim 17, wherein said source control processor prohibits deletion of a child file to each locked file in the program.

\* \* \* \* \*